No. 11,743. Reissued May 23, 1899.

J. H. PARSONS.

ROTARY ENGINE.

(Application filed Apr. 27, 1899.)

2 Sheets—Sheet 1.

Witnesses:

Murray C. Boyce

Louis W. Whitehead.

Inventor:

J. H. Parsons.

by his Attorneys:-

Howson & Howson

No. 11,743.

Reissued May 23, 1899.

J. H. PARSONS.

ROTARY ENGINE.

(Application filed Apr. 27, 1899.)

2 Sheets—Sheet 2.

Witnesses:

Murray C. Boyer

Louis M. Whitehead.

Inventor:

J. H. Parsons.

by his Attorneys:

Howson & Howson

UNITED STATES PATENT OFFICE.

JOHN H. PARSONS, OF WILMINGTON, DELAWARE, ASSIGNOR, BY DIRECT AND MESNE ASSIGNMENTS, TO THE PARSONS' ENGINE COMPANY, OF SAME PLACE.

ROTARY ENGINE.

SPECIFICATION forming part of Reissued Letters Patent No. 11,743, dated May 23, 1899.

Original No. 605,906, dated June 21, 1898. Application for reissue filed April 27, 1899. Serial No. 714,758.

*To all whom it may concern:*

Be it known that I, JOHN H. PARSONS, a citizen of the United States, residing at Wilmington, in the county of New Castle and State of Delaware, have invented certain new and useful Improvements in Rotary Engines; and I do hereby declare the following to be a full, clear, and exact description of the invention, such as will enable others skilled in the art to which it appertains to make and use the same.

My invention relates to alternating-piston rotary engines which comprise in their structure a stationary cylinder, two continuously-rotatable pistons provided with cranks, and links so connected with a wheel or disk secured to an eccentric driving-shaft that said pistons will be alternately rotated at variable speeds.

The object of the invention is to provide an improved construction of rotary engine which shall possess superior advantages with respect to efficiency in operation.

The invention consists in the novel construction and combination of parts, as hereinafter fully described and claimed.

Figure 1:
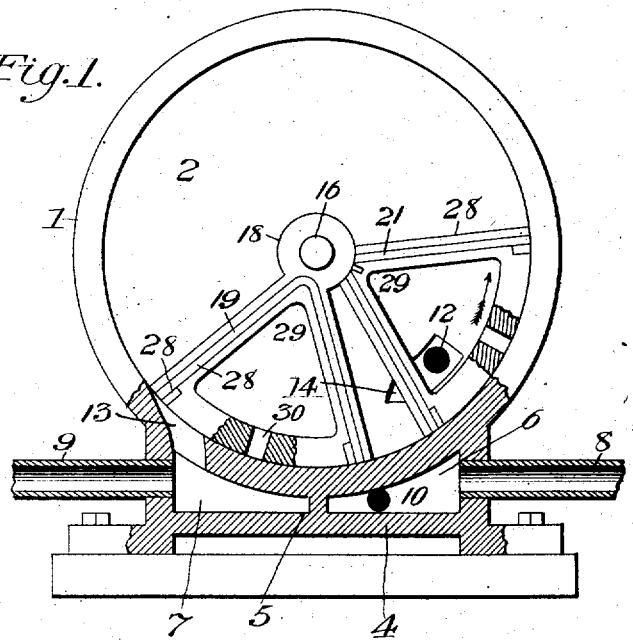
Figure 2:
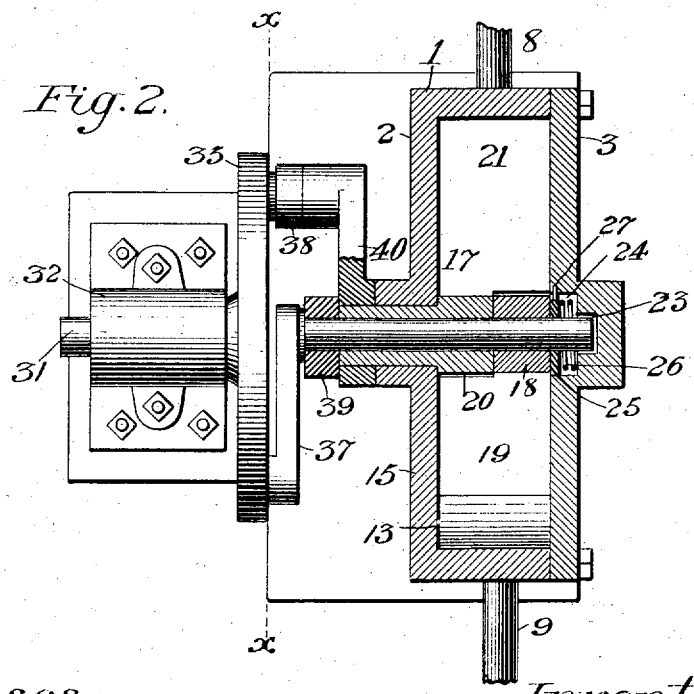
Figure 3:
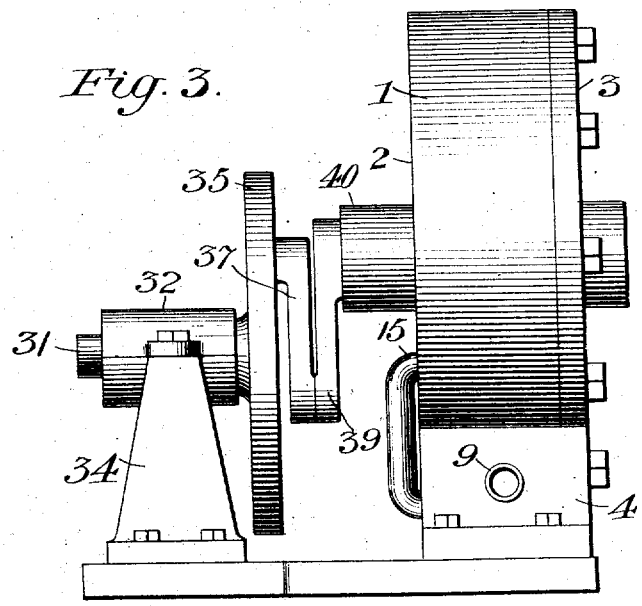
Figure 4:
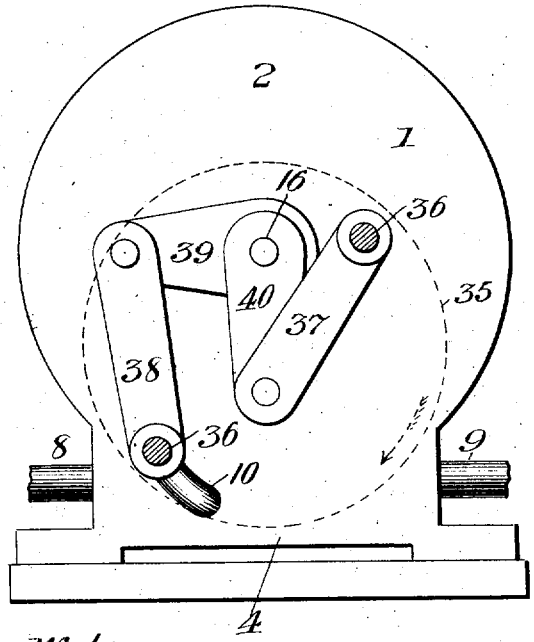
Figure 5:
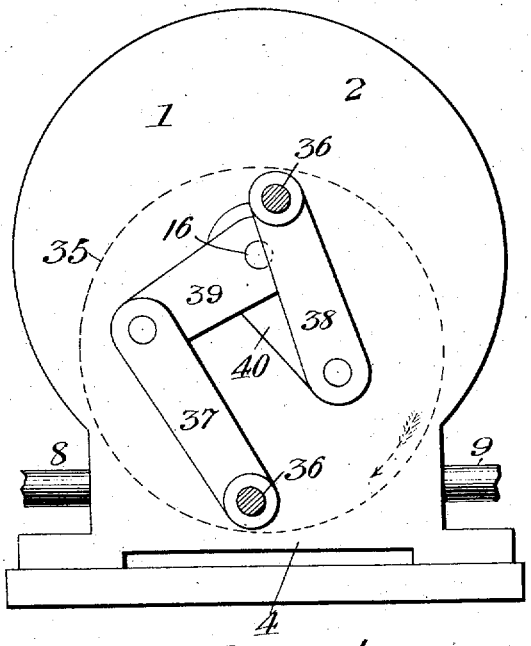

In the accompanying drawings, Figure 1 is a side elevation of a rotary engine constructed in accordance with my invention, the cylinder-head being removed to show the pistons and the piston-rims partly broken away to show the openings therein. Fig. 2 is a plan view of the same, partly in horizontal section. Fig. 3 is a side elevation. Fig. 4 is a transverse sectional view on the line $x\ x$, Fig. 2. Fig. 5 is a similar view showing the cranks and links in different positions.

In the said drawings the reference-numeral 1 designates the cylinder, provided with heads 2 and 3, the inner head 2 being preferably cast integral therewith, while the outer one 3 is bolted to the cylinder. Also formed with the cylinder is a hollow base 4, divided by a central partition 5 into an inlet steam-chamber 6 and an exhaust-chamber 7, provided with inlet and exhaust pipes 8 and 9. The inlet-chamber communicates with a steam-passage 10, which in turn communicates with an inlet-opening 12 in the inner side of the cylinder-head 2. The exhaust-chamber communicates with an exhaust 13 in the cylinder. It will be seen that the inlet-opening 12 is contracted, as seen at 14, Fig. 1, for a purpose hereinafter described.

The head 2 of the cylinder is provided with a boss 15, through which passes a shaft 16, on which is journaled a sleeve 17, both of which are rotatable independently of each other. Secured to the said shaft is the hub 18 of a piston 19, while secured to or formed integral with the sleeve is a similar hub 20 of a piston 21. These hubs at their adjoining ends are cut away for about one-half of their length, so that the inner ends of the piston will overlap the same.

Formed centrally in the removable head of the cylinder are two recesses 23 and 24, with which the shaft 16 and the hub 18, respectively, engage. A washer 25 is interposed between said hub 18 and the cylinder-head, which is pressed against the hub by a spring 26, so as to make a steam-tight joint, while a dowel 27 engages with slots in the cylinder-head and washer to prevent the latter from rotating.

The numeral 28 designates spring-pressed packing-strips inserted in grooves in the pistons. The pistons are made hollow or formed with openings 29, extending therethrough and connecting the opposited side of said piston, the latter having apertures 30 in the rims. These openings, it will be observed, are adapted to receive steam from the inlet in the head of the cylinder as the pistons rotate, so that the motive fluid will pass to both sides of the piston and counterbalance the same against end pressure. The purpose of these is to counterbalance the pistons against the centrifugal force of the pistons when rotating at a high speed, steam entering the pistons from the inlet-opening and pressing against the rim of the cylinder.

The numeral 31 designates the driving-shaft, eccentric to the cylinder and journaled in bearings 32, supported by a standard 34. Secured to the inner end of this shaft is a wheel or disk 35, provided at diametrically opposite points with wrist-pins 36, to which are journaled links 37 and 38, which in turn are pivoted at fixed points thereon to cranks 39 and 40, secured to the shaft 16 and sleeve 17, respectively.

The operation is as follows: In the position shown in Fig. 1 steam is admitted between the pistons from the inlet-opening and will force the same in the direction shown by the arrows, the rear piston acting as an abutment for the front one. The front piston will be rotated rapidly with a gradually-increasing speed, while the rear one will rotate with gradually-decreasing speed until its speed is about one-fourth the speed of the front piston, owing to the crank-and-link connections with the disk of the driving-shaft. It will be thus observed that the pistons are rotated at alternately variable speeds, the maximum proportion between the two speeds being attained when the front piston is moving about four times as fast as the rear or abutment piston. After the first piston passes the inlet-opening the supply will be cut off by the advancing edge of the following piston and the piston will be further rotated by expansion. As the said piston nears the end of its stroke the steam-pressure will decrease, but the power exerted on the driving-shaft will not vary, as the leverage of the crank and link will be increased, owing to their change in position. When the front piston reaches the exhaust, the other piston will have reached the inlet-opening, when it will become the fast piston and the other piston the slow one. This operation will be kept up continuously as long as steam is supplied to the cylinder, the speed of the two pistons alternately varying. When the rear edge of the front piston reaches the exhaust to open the same, the crank, link, and the driving-shaft disk will be just approaching or on a center, so that any exertion of pressure on either side of the piston will be resisted, at which time the leverage of said piston is the least, and it changes from the acting piston to the abutment, while the other piston is on the point of becoming the acting piston. At or slightly prior to this position, however, when the said front piston has started to move away from the abutment-piston and in order to provide a cushion between the two pistons at such time to insure smooth running and at the same time admit motive fluid between the pistons at the proper time to insure forward movement without undue back pressure, I contract the forward end of the inlet-port 12, as shown at 14, Fig. 1. This construction therefore provides for a retardation of full admission or reduced supply of motive fluid until the leverage of the piston to become active has become greater than the other piston, avoiding undue back pressure and reducing to a minimum any tendency to shock or jar. As this latter piston continues its movement the leverage between its crank and the link and the driving-shaft disk will be increased, so that the front piston will rotate about four times as fast as the back one when the maximum speed of the front piston is attained, the back piston being moved forward after its crank and link passes the center by the movement of the said disk and the connections. There are no valves admitting and exhausting steam, and there will be only one dead-center to be overcome for each complete revolution of the acting piston—namely, when the two pistons are closest to each other, at which time the admission of steam through the contracted inlet will cause the front piston to continue its movement in the proper direction.

Having now fully described my invention, what I claim as new, and desire to secure by Letters Patent, is—

1. In a rotary engine, the combination with the stationary cylinder, the base of which is formed with an inlet and exhaust chamber, communicating therewith, of the rotatable shaft, the sleeve journaled thereon, the hollow pistons adapted to receive steam from the inlet-chamber and formed with openings in the rim, the eccentric driving-shaft, the disk secured thereto, the links pivotally connected with said disk at diametrically opposite points, and the crank secured to said shaft and sleeve and pivotally connected to the link, substantially as described.

2. In a rotary engine, the combination with the cylinder, the base formed with an inlet and exhaust chamber, and the rim formed with an exhaust-opening, and the cylinder formed with an inlet-opening with a contracted end, and the inlet-pipe communicating therewith and with the inlet-chamber, of the rotatable shaft, the sleeve, the alternately-operating pistons, formed with steam-chambers and with openings in the rims, the eccentric driving-shaft the disk secured thereto, the links pivotally connected with said disk at diametrically opposite points, and the cranks secured to said shaft and sleeve and pivotally connected with said links, substantially as described.

3. In a rotary engine the combination with the stationary cylinder, provided with an inlet in the head thereof, and an exhaust communicating with said cylinder, of the rotatable shaft, the sleeve journaled thereon, the pistons acting alternately as an abutment and piston, each provided with an opening therethrough connecting the opposite sides thereof and adapted to receive steam from the inlet as the pistons rotate, the eccentric driving-shaft, the disk secured thereto, the links pivotally connected with said disk at diametrically opposite points, and the cranks secured to said shaft and sleeve and pivotally connected with the links, at fixed points thereon, substantially as described.

4. In a rotary engine, the combination with a cylinder having an exhaust-port, a shaft, pistons carried by said shaft acting alternately as an abutment and piston, an eccentric driving-shaft, connections between said driving-shaft and piston, so constructed as to cause the pistons to move alternately at varying speeds, said cylinder being provided with an inlet-port having a contracted end, adapted to admit the motive fluid gradually between the pistons when they approach each other, substantially as and for the purpose set forth.

5. In a rotary engine, the combination with a cylinder, pistons in said cylinder, a shaft by which said pistons are carried, a driving-shaft, connections between said driving-shaft and pistons, so constructed as to cause the pistons to rotate alternately at varying rates of speed, said cylinder having an inlet-port controlled by the movements of the piston and provided with a contracted end, whereby a reduced motive-fluid supply is admitted between the pistons prior to a full admission, substantially as and for the purpose set forth.

In testimony whereof I have affixed my signature in the presence of two witnesses.

JOHN H. PARSONS.

Witnesses:
EVA M. POOLE,
CHARLES W. GOODING.